United States Patent [19]
Willard et al.

[11] 3,936,180
[45] Feb. 3, 1976

[54] XEROGRAPHIC APPARATUS WITH SAMPLE PRINT CAPABILITIES

[75] Inventors: Charles F. Willard, Palos Verdes Estates, Calif.; Brian D. Marsden, Rochester; John G. Richardson, Fairport; James L. Gastonguay, Penfield, all of N.Y.

[73] Assignee: Xerox Corporation, Stamford, Conn.

[22] Filed: Jan. 4, 1973

[21] Appl. No.: 321,115

[52] U.S. Cl. .................... 355/14; 355/3 R; 271/64
[51] Int. Cl.² .................................... G03G 15/00
[58] Field of Search ............. 355/3 R, 14; 271/64 R

[56] References Cited
UNITED STATES PATENTS

| | | | |
|---|---|---|---|
| 3,191,928 | 6/1965 | Neiden et al. | 271/64 R |
| 3,588,472 | 6/1971 | Glaster et al. | 355/14 X |
| 3,589,808 | 6/1971 | Del Vecchio | 355/3 R |
| 3,705,543 | 12/1972 | Rees | 355/3 R |
| 3,709,492 | 1/1973 | Baker et al. | 271/64 R |

Primary Examiner—Robert P. Greiner
Attorney, Agent, or Firm—Michael J. Colitz; Terry J. Anderson; Leonard Zalman

[57] ABSTRACT

A printing system adapted for creating hard copy output from computer generated digital pulses. This system feeds blank or preprinted paper from a paper supply station through a xerographic processor wherein readable computer generated images are created thereon. The information bearing paper is then transported to a paper receiving station which comprises one or more paper receiving bins. Alternatively, an auxiliary feed path for the output paper is created to direct pages, under certain circumstances, to a sample print tray. Paper deflecting fingers are provided to divert pages to the sample print tray under the control of the operator in response to one of four conditions. These conditions include: (a) The feeding of a sample page through the processor when power is first applied to the machine after the machine has been in a powerless state, or (b) After a jam in the system has been cleared and it is desired to abort pages which have not been removed from the paper path. In this mode, the system may also cause the feeding of a sample page through the processor and direct it to the sample print tray, or (c) Any time during the normal operating cycle of the machine when a supplemental copy or a sample page is desired to be made to check the copy quality being produced by the system, or (d) When it is desired to print the contents of specified controller memory locations for diagnostic troubleshooting purposes.

1 Claim, 3 Drawing Figures

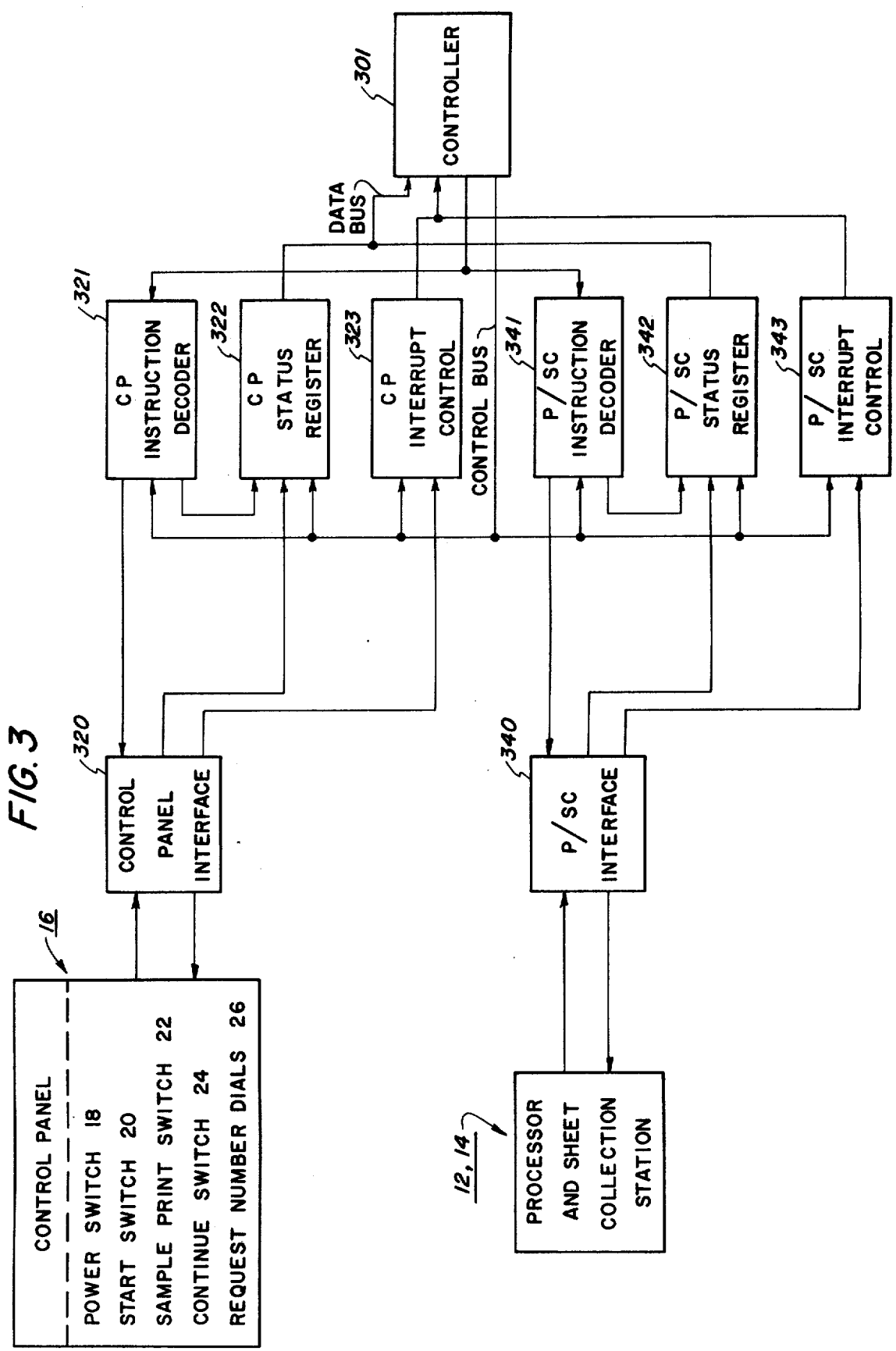

XEROGRAPHIC APPARATUS WITH SAMPLE PRINT CAPABILITIES

This invention relates to printing systems for computer output and, more particularly, to an electrostatic type, non-impact printing system having paper conveying means to direct the output copy to a paper receiving station and, at the discretion of the operator, means to direct certain sample prints to a sample print tray remote from the primary paper receiving station.

One form of non-impact type printing system utilizes a xerographic processor with an optical character generator. In this type of printer, a high speed character bearing drum is utilized, the drum having individual character sets for each character position in the line, together with flash illumination units disposed inside the drum. These flash units illuminate the characters in accordance with computer generated signal information. A lens assembly projects the flashed images to the photosensitive surface of a photoreceptor contained within a xerographic processor.

The system includes a paper feed path which normally directs paper from a paper supply station through the processor for the creation of toner images thereon. The paper is then desirably directed to a paper receiving station which, in the instant embodiment, includes first and second sheet collecting bins. On occasions, however, it is desirable to direct pages to a station remote from these bins. For example, first thing in the morning after the machine has been in a power-off state and the processor is to be operated, it may be desirable to run a sample page through the processor to test the system including its xerographic printing capabilities. This sample page may be obtained by depressing a SAMPLE PRINT button and the resulting page is directed to a sample print tray for the operator to determine the acceptability of the system and verify its smooth functioning capabilities.

The same sample print feature may also be utilized any time during operation after a paper jam has occurred and has been cleared. In these instances the xerographic processor will become inactivated due to the jam. After this time the paper jam must be cleared by the operator. Under these circumstances paper may become arrested along the path of movement between the paper supply station and the paper receiving station. In this second mode of operation, when the CONTINUE button is depressed, any paper remaining in the paper feed path from the paper supply station to the diverter fingers which direct pages to the sample print tray will be fed to the sample print tray in an abort fashion while a supplemental sample copy is fed through the processor to the sample print tray whereby the operator can then check for correct paper handling operation of the system. This aborting of the arrested sheets reduces operator involvement in correcting an undesirable state and thus minimizes the chance of losing the integrity of the output print job.

The third mode of operation occurs as when it is desirable to run a sample print through the xerographic system at any time during the normal operation of the system. In this case, the depression of the SAMPLE PRINT button will generate a command whereby the page being then printed will be directed to the sample print tray. The controller is programmed to cause reprinting of that page so deflected, and deliver it to the paper receiving station, maintaining output integrity. In the third mode of operation, logic is provided to cause the controller to repeat diverted pages and consequently, maintain the integrity of copy directed to the paper receiving station. By integrity it is meant the completeness of copy processed and received in the paper receiving station as compared with the variable information generated by the computer for being printed. In other words, if the controller were to ignore the fact of a sample print or prints, the integrity of copy in the paper receiving station would be lost since one or more of the pages would be directed to the sample print tray.

The fourth mode of operation occurs when it is desired to print the contents of specified controller memory locations for diagnostic troubleshooting purposes. In such a case, these controller memory locations are defined by one of several "request numbers" selected by the operator via the control panel. It is not necessary to depress the SAMPLE PRINT button in this mode. All pages will be delivered to the sample print tray as the result of depressing the START button.

As can be appreciated, the sample print capabilities of the instant system are thus provided to expand the utility of the system and minimize the prospects for creating output which either lacks integrity with respect to the input or the most desirable copy quality.

It is, therefore, an object of the present invention to improve printing systems.

It is a further object of the present invention to permit printing systems to be periodically monitored to test the printing quality of the image creating elements.

It is a further object of the present invention to minimize operator involvement in running printing systems or in the clearing of the sheet feed path after a jam in the processor.

It is a further object of the present invention to facilitate and simplify diagnostic troubleshooting activities.

These and other objects of the instant invention will become apparent from the following disclosure and drawings wherein:

FIG. 3 is a functional block diagram of illustrative control circuitry for the sample print capabilities of the system of FIGS. 1 and 2.

Figure 1:
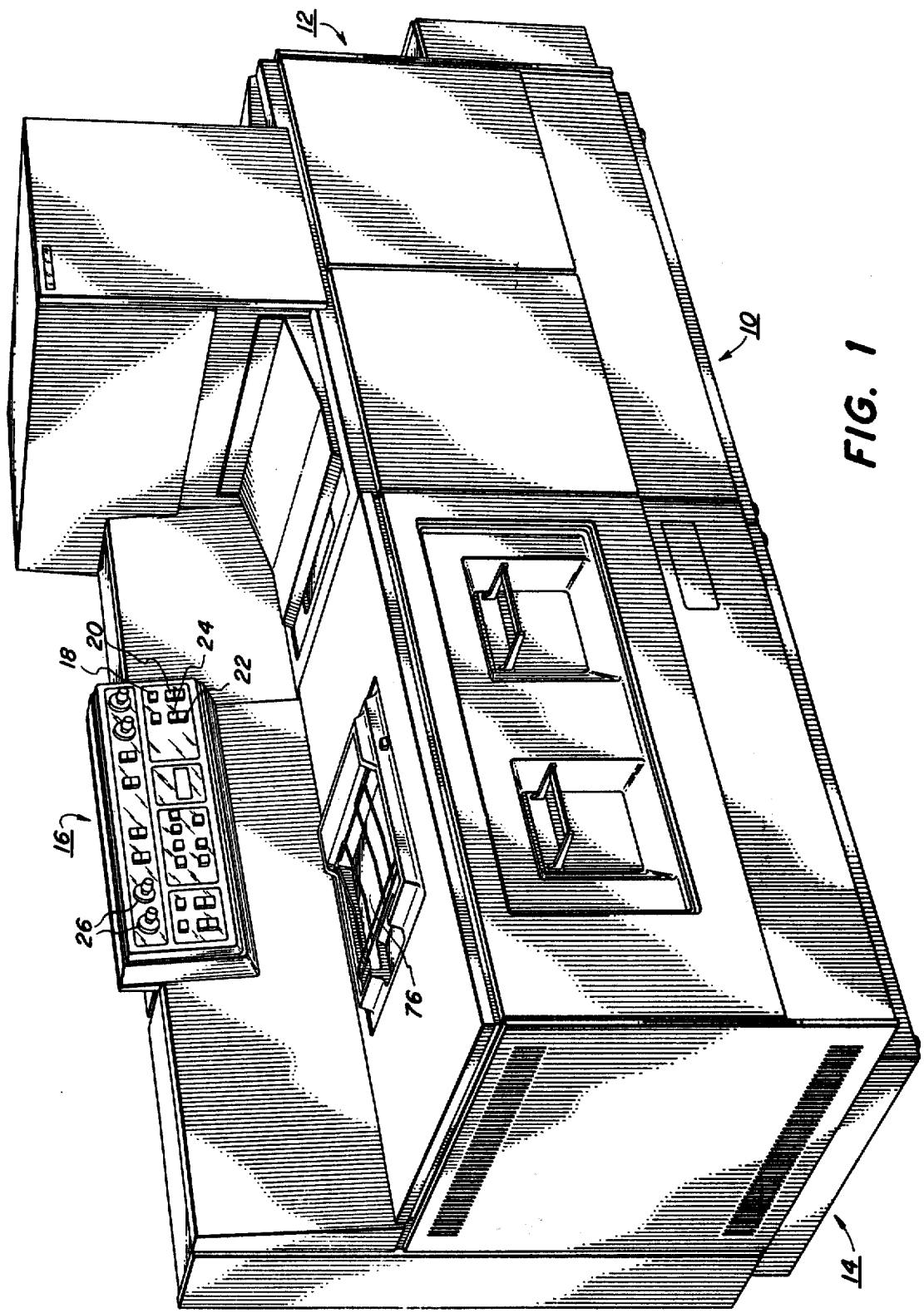
FIG. 1 is a perspective view of a xerographic printing system incorporating the sample print apparatus of the present invention.
Figure 2:
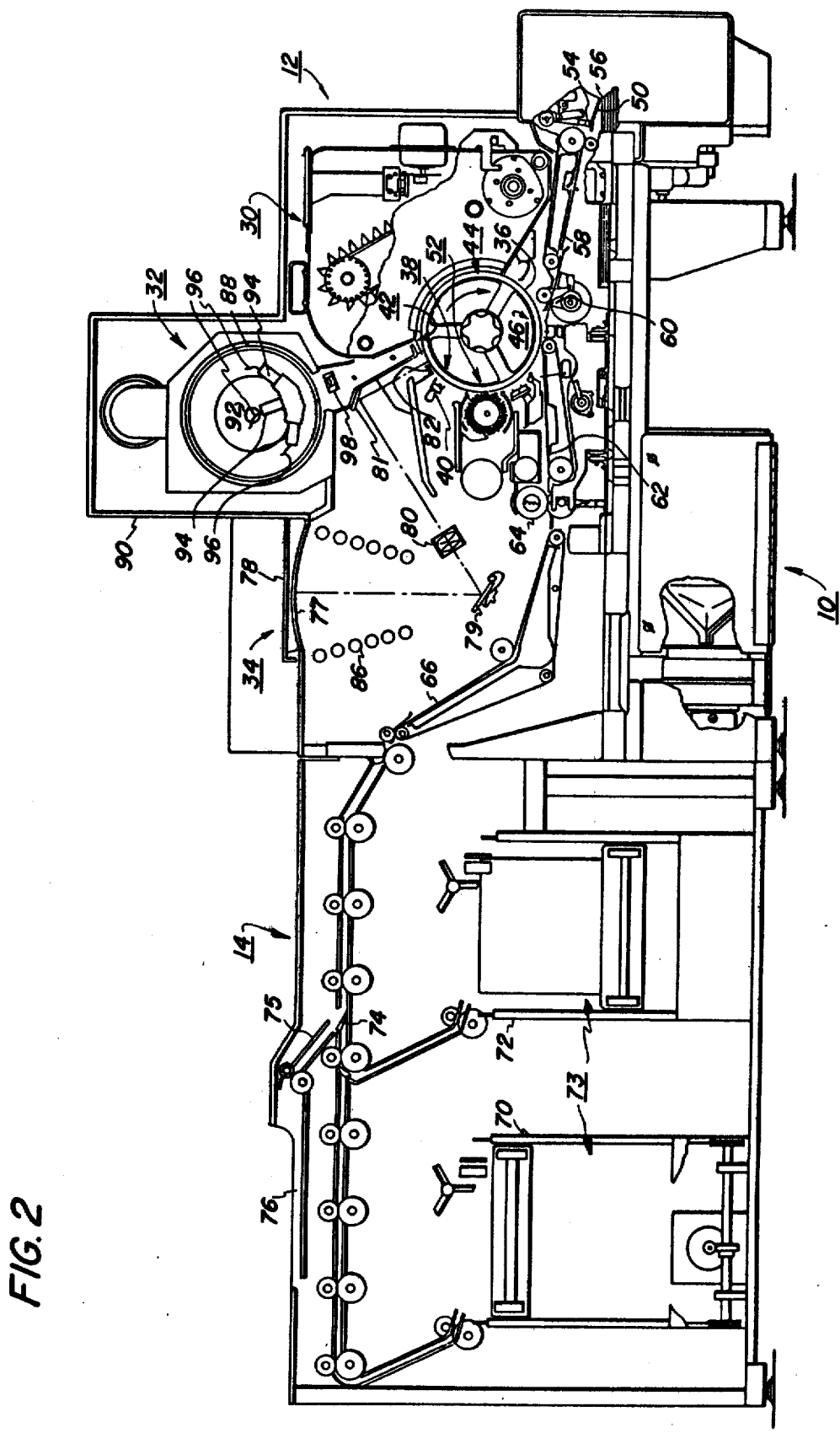
FIG. 2 is a schematic view of the xerographic printing system shown in FIG. 1.

Referring to FIGS. 1 and 2 of the drawings there is shown a printing system 10 which includes a xerographic processor portion or printing apparatus 12 and a paper collection station 14. The operator control panel 16 includes buttons 18, 20, 22 and 24 constituting, respectively, the POWER button, the START button, the SAMPLE PRINT button, and the CONTINUE button, respectively. Dials 26 are the REQUEST NUMBER dials for use by the operator in calling certain job set-up information which has been pre-stored. Also pre-stored under one or more request numbers is set-up information which facilitates diagnostic troubleshooting. SAMPLE PRINT button 22 is back lighted to indicate that the machine is operating in a sample print mode.

Referring to FIG. 2 of the drawings, there is shown schematically the system as shown in FIG. 1. The xerographic apparatus 12 includes a processor 30 which includes the optical type character generator 32 which, in combination with a controller, not shown, constitutes a source of variable information to the xerographic printer. The processor also includes a platen 34 designed to permit forms overlay material to be copied in conjunction with a line copy generated by character generator 32. The processor also includes a xerographic plate 36 bearing a photoconductive layer or light receiving surface on a conductive backing and formed in the shape of a drum. This drum 36 is suitably journaled in the processor frame to rotate in the clockwise direction as shown in FIG. 2 to move the surface of the drum sequentially past a series of xerographic processing stations arranged about the periphery of the drum. The xerographic processing stations include (1) a charging station 38 wherein a uniform electrostatic charge is deposited on the photoconductive layer of the drum by means of a suitable corona discharge device 40, (2) an exposure station 42 wherein a light or radiation pattern of the information being copied is projected onto the surface of the drum to form latent electrostatic images, (3) a developing station 44 wherein a suitable xerographic developer materials is applied to the surface of the drum to provide a toner image, (4) a transfer station 46 wherein the toner image is electrostatically transferred from the drum to a suitable transfer material such as copy sheet 50, and (5) a drum cleaning station 52 wherein residual toner remaining on the drum is removed in preparation for reuse of the drum.

A sheet feeder 54 is provided for advancing copy sheets 50 one by one from supply stack 56 to paper transport 58. Transport 58 conveys the individual sheets forward to sheet register station 60 just in advance of the drum and transfer station. These sheet register fingers serve to align and time the sheets in correspondence with the movement of the toner image on the drum. As the copy sheets move through the transfer station 46, the developed image is transferred from the drum to the sheet.

Following transfer, each image bearing copy sheet is conveyed by conveyor 62 to fuser 64 where the toner image is permanently fixed to the sheet material. Thereafter, the sheet is conveyed by discharge conveyor 66 to the sheet receiving station 12 wherein it is disposed in one of the stacking trays 70 or 72 which together constitute the primary sheet receiving means.

The sheet feed members 58, 62, 66 as well as the rollers and guide means which direct sheet material to the primary sheet receiving means 73 constitute the primary sheet conveying means. The secondary sheet conveying means extends from and includes the sheet deflecting finger 74, along path guides 75 to the sample print tray 76. Note is taken that some sheet driving rollers may be common to both the primary and secondary sheet conveying means.

Further details of the xerographic processor as described above can be had with reference to U.S. Pat. No. 3,301,126 issued to R. F. Osborne et al.

In the optical area of the processor, platen 34 of the processor consists of a transparent surface such as glass 77 on which the forms document being used is placed face down. A suitable platen cover 78 is provided to protect the glass and retain the forms document in place during operation. The document on the platen is scanned by the moving mirror 79 operating in timed relation to the movement of the drum, with the resulting light images being projected by lens 80 and mirror 81 onto the surface of the drum at the exposure station 42. The forms image strikes the drum at a point designated generally by the numeral 82. Slightly beyond this line the line image produced by character generating assembly 32 strikes the drum. The lamps 86 below the platen serve to illuminate the forms document resting on the platen glass.

The variable input of the instant embodiment is designed to be programmed by a computer and rendered into visible information by the optical character generator. The optical character generator assembly 32 comprises a transparent character mask or drum 88 on which a series of individual sets of alphanumeric characters are arranged in predetermined orientation. Drum 88 is suitably journaled for rotation within the tower 90 supported on the processor by bearings 92. The tower 90 is configured to form a protective enclosure encasing the drum 88, flash lamps 94, lines 96 which operate the programmed flashing thereof, and other operating components together with the drum drive motor which operates in synchronism with the main motor for the xerographic processor.

Lens assembly 98 is utilized to project these light images to the xerographic surface for the creation of an image correlated with the image received on the drum from the forms overlay whereby the composite latent image may be developed and transferred to the sheet material fed through the transfer station.

The entire optical character generator is motivated through a controller either internal or external of the processor for the creation of output correlated to the computer generated input. Further details of the optical character generator may be had by reference to copending application Ser. No. 303,454, filed, Nov. 3, 1973.

The entire processor is rendered operational or rendered disabled through alternate depressions of the POWER button. When the POWER button has been energized, the machine is in standby condition awaiting the depression of the START button whereby the controller will start generating the preprogrammed pulses to the optical character generator in synchronism with the rotation of the xerographic drum in association and in synchronism with the operation of the various xerographic processing stations and sheet feeding mechanisms. This will continue until the end of the run as determined by the controller or until the POWER button is depressed again or until a malfunction occurs.

The sample print function operates in four distinct, but somewhat related, modes. In all of the modes the desire of the function is to forward a sheet from the stack of sheet material, through the xerographic processor, to the sample print tray which is remote from the stackers but readily accessible to the operator.

These four modes are, in general: (1) After the POWER button has been depressed following a power off condition, it may be desirable to test the xerographic processing capabilities by running a sample print prior to operating the computer printer in an automatic mode; (2) To feed sheets remaining in the processor after a jam. In this case, any unjammed paper remaining in an operator-inaccessable portion of the paper path is cleared from the paper path to the sample print tray and one blank sample print sheet is also fed through the paper path to the sample print tray; (3) To make a sample print anytime during normal processing. The sample print page, as in the other two modes, is directed to the sample print tray. It should be noted that this third mode requires the reprocessing of certain input data to repeat the sample page which was diverted to the sample print tray and deliver the repeated page to the stacker. (4) To print the contents of specified controller memory locations for diagnostic troubleshooting purposes. In all instances, it is noted that the function is to activate the sample print solenoid and diverter fingers to direct sheet material from its normal path of travel which would have otherwise taken the sheet material to the output stacker.

It is further noted that other conditions may cause paper to be diverted to the sample print tray as, for example, where an error in parity or flash lamp errors cause a deficiency in the print. Other logic as described in copending application Ser. No. 309,292, filed Nov. 24, 1972, cover this contingency and are not part of this invention since the diversion of sheet material is not effected by virtue of depression of the SAMPLE PRINT button. Such other logic, as the power on, power off, start print, etc. pulses and the jam cleared pulses, couple with the logic as described herein and are more fully described in the aforementioned Osborne et al patent.

Referring now to FIG. 3, depicted therein is a functional block diagram of illustrative control circuitry for operating the illustrative printing system in accordance with the principles of this invention. Controller 301 functions in response to operator requests generated at control panel 16 to send appropriate signals to control processor and sheet collection station 12, 14. Controller 301 also responds to signals indicating the instantaneous system status to issue further commands to the system. In the preferred embodiment, controller 301 is a mini computer but may in fact be any central processor, either software programmable or hard wired. The particular design of controller 301 does not form a part of the present invention and will only be discussed functionally as it relates to this invention.

Control panel 16, which includes POWER switch 18, START switch 20, SAMPLE PRINT switch 22, CONTINUE switch 24 and REQUEST NUMBER dials 26, is connected to control panel interface 320. Control panel interface 320 communicates with controller 301 through control panel instruction decoder 321, control panel status register 322 and control panel interrupt control 323. Similarly, processor and sheet collection station 12, 14 is connected to interface 340 which in turn communicates with controller 301 through instruction decoder 341, status register 342 and interrupt control 343. The decoders, status registers and interrupt controls communicate with controller 301 through a system of busses as indicated in FIG. 3. The details of the decoders, status registers, interrupt controls and the bus system will not be described herein because their design would be readily apparent to one skilled in the art depending upon the particular controller used and the overall system architecture.

All switch actuations occurring at control panel 16 are sensed by control panel interface 320 and the appropriate interface interrupt procedure is employed to load status register 322 with information originating at control panel 16 for transfer to controller 301. This information is interrogated and processed by controller 301 into a set of suitable instruction codes and passed to processor/sheet collection station interface 340 to initiate action at processor and sheet collection station 12, 14. For example, when SAMPLE PRINT switch 22 is depressed, control panel interface 320 senses the depression of the switch, stores a suitable code in status register 322, and initiates an interrupt signal through interrupt control 323 to controller 301. Controller 301 determines the origin of the interrupt and initiates the appropriate status register read operation. On interrogating the status information, controller 301 determines that SAMPLE PRINT switch 22 has been actuated, interrogates the status of the system to determine the operational characteristics and issues the appropriate instruction to light the SAMPLE PRINT lamp through control panel interface 320. A paper pick operation is initiated through P/SC interface 340. Once a page has been picked, controller 301 initiates a data transfer sequence and designates through the instruction protocol that the page image is to be diverted into sample print tray 76. When the page image sequence is completed, controller 301 is informed by P/SC interface 340 by the initiation of an interrupt signal through interrupt control 343 and the loading of the proper code into P/SC status register 342. Upon acknowledging this interrupt signal and interrogating the contents of status register 342, controller 301 determines that the page image sequence has been completed and issues an instruction to control panel interface 320 to extinguish the SAMPLE PRINT lamp. Controller 301 thus functions to set up a communication link between control panel 16 and processor and sheet collection station 12, 14. Controller 301 monitors the state of the interface modules comprising the system and exercises control depending upon the system operational status in response to switch actuation at control panel 16. The response of processor and sheet collection station 12, 14 to switch actuation at control panel 16 are dependent upon controller 301 interrogating the overall system status and subsequent transfer of information derived from control panel interface 320.

The basic operation of the system for producing a sample print is the same, no matter which of the above mentioned four modes are involved. In the illustrative processor depicted in FIG. 2, there is room in the paper path between transfer station 46 and sheet deflection fingers 74 for five sheets of paper. Therefore in order to properly implement the sample print feature, there must be provided means for keeping track of the position in the paper path of the sheet which is to be diverted to sample print tray 76. Illustratively, this may be accomplished by utilizing a five stage shift register, setting a bit in the first stage when the sheet to be sampled passes transfer station 46 and shifting this bit one position in the shift register each time the registration point of a page image on drum 36 passes a fixed point. When the bit is shifted out of the last stage of the shift register, this bit may be utilized to control circuitry which operates a solenoid controlling the motion of deflecting fingers 74.

In the first mode of operation, when power is applied to the system a pulse is generated which sets all five stages of the aforementioned shift register. This allows pages to be left in the paper transport following a paper jam or for any other reason and assures the direction of all these pages into sample print tray 76 when the print cycle is initiated.

In the second mode, in the event there is a paper jam in the middle of a print cycle, when the jam is cleared and it is desired to continue the print cycle, CONTINUE switch 24 on control panel 16 is depressed. Depression of this CONTINUE switch causes controller 301 to generate a sample page which is diverted to sample print tray 76. This is accomplished as described above by setting a bit in the shift register.

In a similar manner, the third mode of operation is initiated by the operator depressing SAMPLE PRINT button 22 on control panel 16. This causes the page currently being imaged, or the next page to be imaged in the event that the SAMPLE PRINT switch is actuated between page imagings, to be delivered to sample print tray 76. In this case, controller 301 causes the reimaging of the page which was delivered to the sample print tray.

In the fourth mode of operation, in the event of a system malfunction, a technican may desire to check the contents of memory locations within controller 301. In this case the REQUEST NUMBER dials 26 may be set to one of the request numbers defining the memory locations to be printed and START switch 20 may be depressed. This causes controller 301 to spill out the contents of the desired memory locations, image these contents on one or more sheets, and deliver the sheets to sample print tray 76.

It is to be understood that the foregoing description was on a functional level. The design of both the hardware and the software to implement the described sample print function would be readily apparent to one of ordinary skill in the art once the basic system architecture is defined. While the instant invention has been described as carried out in a particular embodiment, it should be understood that the invention is intended to be covered broadly within the spirit and scope of the appended claims.

What is claimed is:

1. A printing system including:

xerographic apparatus adapted to create images in response to variable data signals supplied thereto and to transfer such images to sheet material fed through the xerographic apparatus, primary sheet receiving means adapted to receive the sheet material processed by said xerographic apparatus, secondary sheet receiving means remote from said primary sheet receiving means and adapted to receive sheet material processed by said xerographic apparatus, sheet supply means adapted to support sheet material to be forwarded through said xerographic apparatus so that graphic information may be transferred to the sheet material in relation to said data signals, primary conveying means to direct sheet material from said sheet support means, through said xerographic apparatus, to said primary sheet receiving means, secondary conveying means between said primary sheet receiving station and said xerographic apparatus to direct sheet material to said secondary sheet receiving means from said primary conveying means, first operator controlled means which, when energized, applies power to the system and permits its operation, second operator controlled means which, when energized, continues the operation of the system for the creation of images after the correction of a malfunction of the system, third operator controlled means for creating a sample print on forwarded sheet material and duplicating said sample print, fourth operator controlled means for creating an image on forwarded sheet material representative of preselected system status indications, and circuit means coupling the four above-mentioned operator controlled means with said secondary conveying means so that activation of any of said operator controlled means causes the activation of said secondary conveying means.

* * * * *